US006954872B2

(12) United States Patent
Parikh

(10) Patent No.: US 6,954,872 B2
(45) Date of Patent: Oct. 11, 2005

(54) REGISTERING EVENTS WHILE CLOCKING MULTIPLE DOMAINS

(75) Inventor: Rupal Parikh, Austin, TX (US)

(73) Assignee: Intel Corporation, Santa Clara, CA (US)

(*) Notice: Subject to any disclaimer, the term of this patent is extended or adjusted under 35 U.S.C. 154(b) by 591 days.

(21) Appl. No.: 09/967,543

(22) Filed: Sep. 28, 2001

(65) Prior Publication Data

US 2003/0065964 A1 Apr. 3, 2003

(51) Int. Cl.[7] .............................................. G06F 11/00
(52) U.S. Cl. ..................................... 713/500; 713/501
(58) Field of Search ................................. 713/500, 501

(56) References Cited

U.S. PATENT DOCUMENTS 3,623,039 A * 11/1971 Barham ........................ 360/48
4,594,709 A *  6/1986 Yasue ............................ 714/4
4,920,282 A *  4/1990 Muraoka et al. ............ 327/218

* cited by examiner

Primary Examiner—A. Elamin
(74) Attorney, Agent, or Firm—Trop, Pruner & Hu, P.C.

(57) ABSTRACT

A semiconductor device determines whether a clocking signal intended for latching an event at the designated location is absent, and if so, information about the event that occurred in the absence of the clocking signal may be provided at the another location. The semiconductor device, in one embodiment, includes first and second clock domains capable of receiving first and second clocks, respectively. When deployed in a processor-based system, one or more interrupting events may be registered. The semiconductor device further comprises an interface to capture the interrupting events based on a control logic implementing a mechanism (e.g., a state machine) capable of remembering information associated with the interrupting events that may occur when the first clock may be temporarily absent. When the first clock restarts, a register subsequently records the information associated with the interrupting events that may have occurred.

30 Claims, 6 Drawing Sheets

REGISTERING EVENTS WHILE CLOCKING MULTIPLE DOMAINS

BACKGROUND

The present invention relates generally to mechanisms for recording events that occur during clock switching, and more particularly to semiconductor devices that register interrupting events for synchronous systems including multiple clocked domains where a particular clock may be temporarily absent.

Within a single computing system, a number of different components or subsystems may operate at different frequencies. In particular, various components or subsystems utilized for the construction of a computing system may independently operate at different frequencies, such as in microprocessors and microcontrollers, where certain components or subsystems have a faster rate of operation than the operating frequencies of other system components or subsystems. Therefore, typically, it is desirable to devise computing systems with the ability to support multiple domains, which may operate at different frequencies.

For instance, most computing systems typically include a number of electronic circuits referred to as "clocked logic domains" that operate independently based on electrical "timing" or "clock" signals. Such clock signals are used to control and coordinate the activities of the computing system's various components or subsystems. One of the clock signals, the system clock signal, is a reference clock signal to which the various components or subsystems of the computer synchronize their operation. The computing system's components or subsystems generally include device clock synthesizer to generate a device clock signal synchronized to the system clock signal.

A synchronously operable semiconductor device, such as a particular device interface, or bus operating at a specific frequency, may define a distinct clocked logic domain. However, fabrication of semiconductor devices having processors has introduced new timing problems for device manufacturers. Registration of interrupting events, particularly between various clocked logic domains presents a number of challenges to the designers and manufacturers of these computing systems. For example, a variety of computing devices, such as hand-held personal digital assistants (PDAs) or wireless devices including mobile phones or a mobile computers (a hand-held computer, palm top computer or notebook computer, as examples) may have at least one mode, such as a sleep mode, to conserve power when the computing device is not currently being used.

Using an interrupt recording mechanism, an event (e.g., an interrupting event, or a transition to a particular mode) may be recorded. However, a synchronous system that needs to register interrupting events that may occur during clock switching may not be maintained fully synchronous because of the asynchronous nature of such interrupting events. For example, during an interrupting event when a specific clock or the clocks to a particular portion or portions of the synchronous system may be turned off, denied, or absent, an event capture mechanism may record the interrupting event asynchronously. Thus, such arrangement, or mechanism for recording the interrupting event may be inadequate for a fully synchronous system, as the synchronous system may be rendered asynchronous in part by the occurrence of the interrupting event.

Accordingly, such technique may be unable to appropriately capture interrupting events across multiple independently clocked logic domains while maintaining a system fully synchronous. Furthermore, absent appropriate interrupt recording mechanism, such approach may create problems in the validation stage of a circuit design including multiple asynchronous circuit regions that may be independently clocked. As a result, a fully synchronous system may not be feasible because such mechanism may be unable to register interrupting events that may occur during data transfer across independently clocked multiple domains where some logic is denied a clock.

Therefore, it is desirable to synchronously record interrupting events.

DETAILED DESCRIPTION

Figure 1:
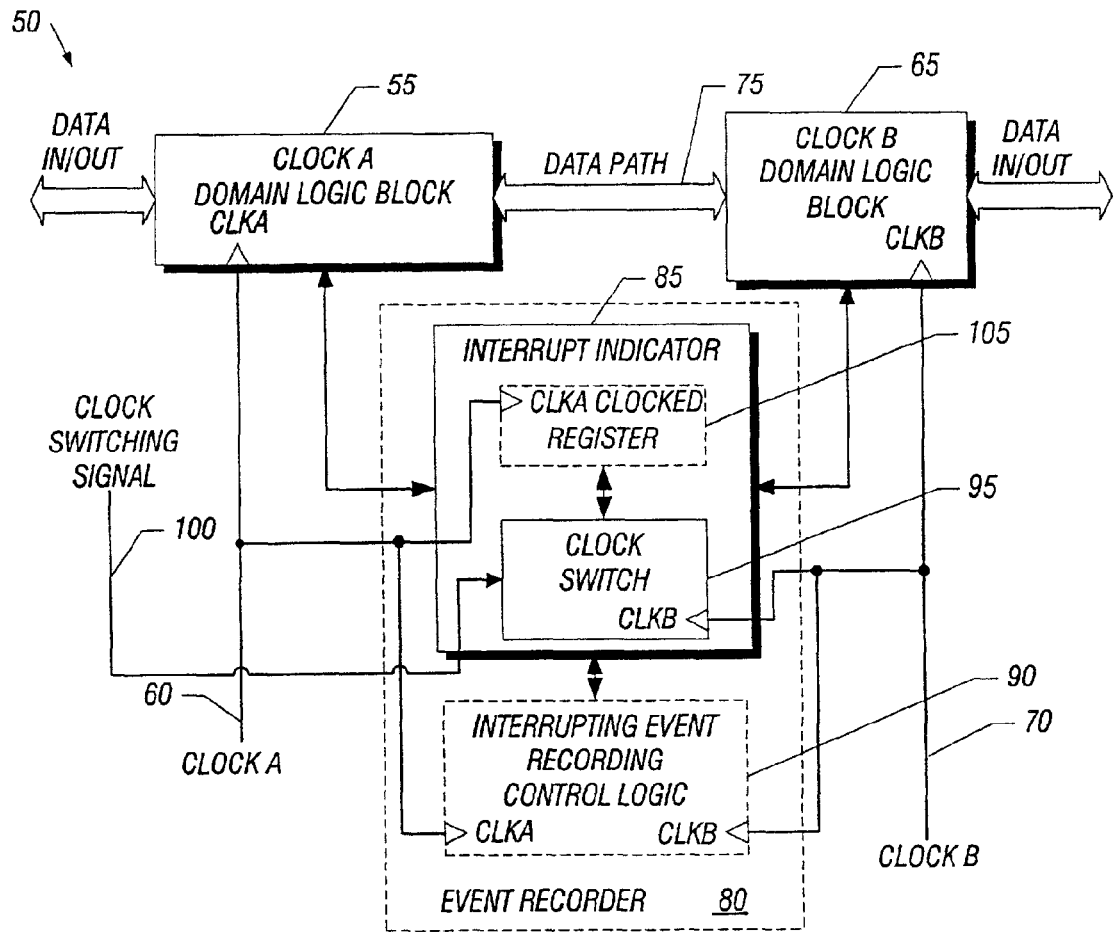
FIG. 1 is a block diagram of an interrupt recording mechanism that may be employed in a synchronous system including multiple asynchronous clocked logic domains, in accordance with one embodiment of the present invention.

A semiconductor device 50 as shown in FIG. 1 includes, in one embodiment, a clock A domain logic block 55 capable of receiving a clock A signal 60 and a clock B domain logic block 65 capable of receiving a clock B signal 70 to transfer data across the clock A and B domain logic blocks 55 and 65. Specifically, the semiconductor device 50 may be deployed in a synchronous system to record events that occur while transferring data between the clock A domain logic block 55 and the clock B domain logic block 65 over a data path 75 (e.g., a bus interface). For this purpose, in one case, the semiconductor device 50 further comprises an event recorder 80. The event recorder 80 includes an interrupt indicator 85 to register one or more interrupting events based on a control logic 90 that records information associated with the interrupting events that may occur when the clock A signal 60 may be temporarily absent. The interrupt indicator 85 further includes a clock switch 95 to controllably operate the clock A signal 60 based on a clock switching signal 100. In addition, a clocked register 105 may be provided for the interrupt indicator 85 that registers the interrupting events that may occur when the clock A signal 60 may be present. In one embodiment, the clocked register 105 may comprise one or more latches or flip-flops to record information associated with the interrupting events.

The synchronous system may be any processor-based system including a wireless phone, computer, personal digital assistant (PDA), pager, portable music player, or any other device capable of receiving information over one or more communication links, such as wireline or wireless. In one embodiment, the synchronous system may be a readily transportable device, such as a hand-held device, which may include a microprocessor, such as a digital signal processor or a mobile wireless processor. Likewise, the semiconductor device 50 may be any electronic device, that can be readily designed and fabricated via a variety of known electronic design automation (EDA) tools including, but is not limited to, simulation and fabrication tools, such as very high speed IC (VHSIC) Hardware Description Language (VHDL) based on Institute of Electrical and Electronics (IEEE) Standards 1076-1987 and 1076-1993 both available from The IEEE, Inc., IEEE Customer Service 445 Hoes Lane, PO Box 1331 Piscataway, N.J. 08855-1331,USA.

In one embodiment, the semiconductor device 50 comprises an interface, i.e., the interrupt indicator 85 is operably coupled between a designated location and another location and the control logic 90 is coupled to the interrupt indicator 85. The control logic 90, in one embodiment, detects one or more occurrences of an event in absence of a clocking signal (e.g., the clock A signal 60) to the designated location. Here, the event may be an interrupting event. In addition, the dedicated location may be included in a first clocked logic domain, i.e., in the clock B signal 70 domain and the another location may be included in a second clocked logic domain, i.e., in the clock A signal 60 domain.

One operation for registering an event while clocking multiple domains involves using the control logic 90 to temporarily remember information associated with the occurrence of the event, for example, in a state machine. However, the scope of the invention is not so limited. Of course, other arrangements such as any suitable hardware may be readily deployed for recording such information pertaining to the occurrence of the event. In one case, the information associated with the occurrence of the event may be temporarily registered within the state machine. When the clocking signal is determined to be present, this information may be transferred for recording from the state machine to the interrupt indicator 85 based on a particular transition from one to another state in the state machine.

In operation, the control logic 90 determines whether the clocking signal (e.g., the clock A signal 60) intended for latching an event at a designated location, i.e., the clocked register 105, is absent. And, if that is the case, information about the event that occurred in the absence of such clocking signal may be temporarily provided at another location. Using the control logic 90 and the clocked register 105, the semiconductor device 50 may first capture an interrupting event (e.g., an alarm event, or a transition to a sleep mode) in a synchronous manner for subsequent recording, for example, in the clocked register 105. In this way, as described below, a synchronous system that includes the semiconductor device 50 essentially registers any interrupting events that may have occurred during clock switching. Thus, the system may be maintained fully synchronous because of the synchronous nature of recording of the occurrence of these interrupting events.

Accordingly, when a specific clock, i.e., the clock A signal 60 or other appropriate clocks to a particular portion or portions (e.g., the clock A domain logic block 55) of the synchronous system may be turned off, denied, or absent, an interrupting event may be synchronously registered. The interrupting event may be first remembered through the control logic 90 and later recorded in the clocked register 105. Thus, as shown in FIG. 2, such arrangement, or mechanism for recording the interrupting event may be adequate for maintaining a system fully synchronous that may otherwise be rendered asynchronous during the interrupting event.

In one embodiment, the semiconductor device 50 provides mechanisms to reliably register events that occur during clock switching. As in most electronic systems, such as in semiconductor systems where multiple clocked domains are present, one or more interrupting events may ideally be registered synchronously. More particularly, in synchronous semiconductor systems having multiple independently clocked logic domains where a particular clocked logic domain may have been denied a clock, such interrupting events may be synchronously registered, allowing seamless propagation of data or signals between asynchronous clock domains. Thus, the semiconductor device 50 enables such data or signal propagation between independently operating clock domains at different, asynchronous frequencies which may be non-integer multiples, in one embodiment.

Likewise, in another embodiment, data transfer may be provided when the clock A signal 60 has a first frequency controlled from the clock switching signal 100 and the clock B signal 70 has a second frequency higher than the first frequency, for example, system and device clock frequencies present in microprocessors generally deployed in a processor-based system. And, more particularly, within hierarchical clock frequency domains for microprocessor core logic functional units, transferring of data and signals may be provided between multiple clocked logic domains (e.g., the clock A, and B domain logic blocks 55 and 65).

Figure 2:
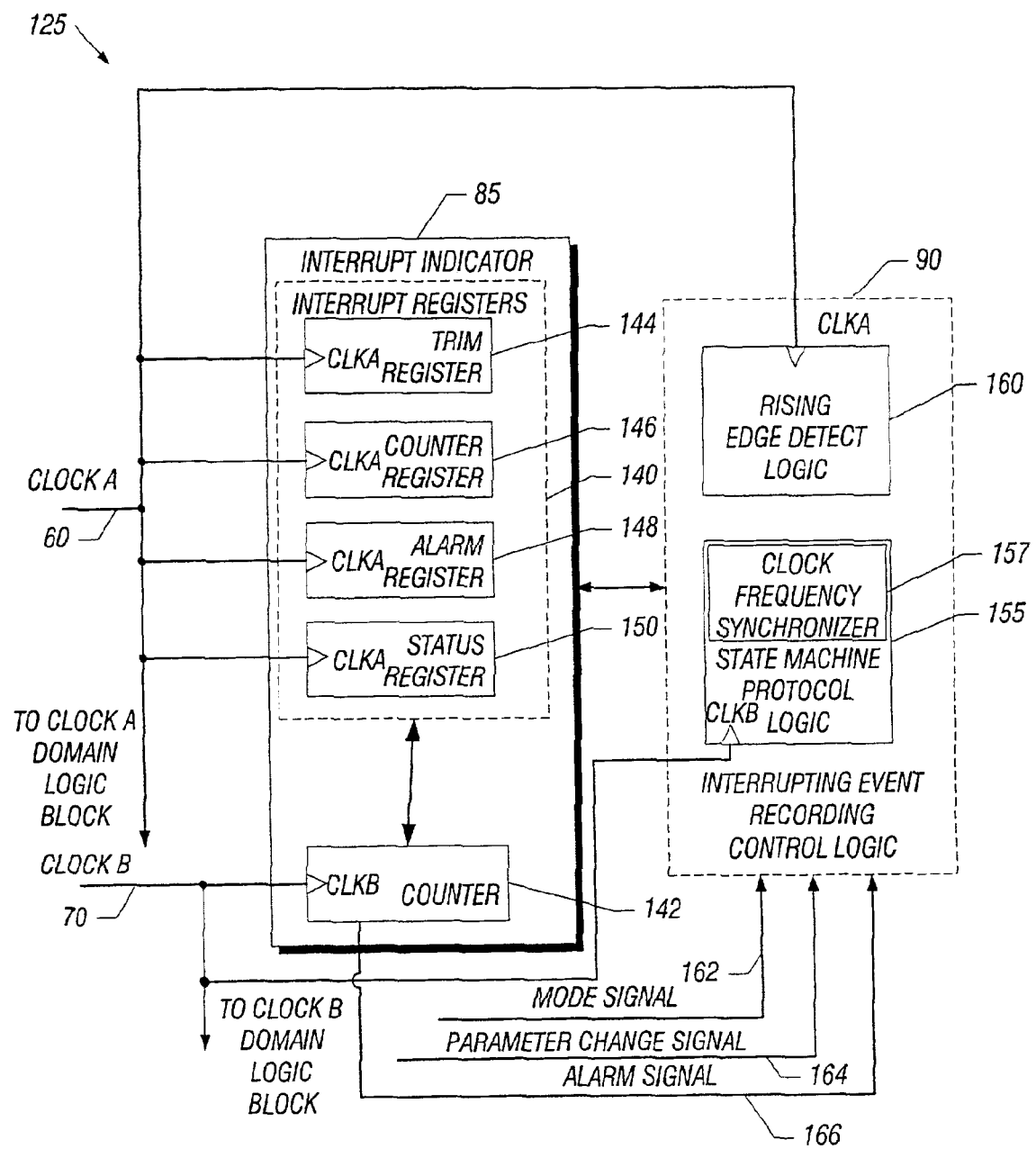
FIG. 2 is a schematic depiction of the interrupt recording mechanism of FIG. 1 according to one embodiment of the present invention.

An interrupt recording module 125 shown in FIG. 2 may be employed in a synchronous system comprising multiple asynchronous clocked logic domains (e.g., the clock A and B domain logic blocks 55 and 65 in FIG. 1), in accordance with one embodiment of the present invention. For the purposes of registering interrupting events, the interrupt indicator 85 includes a plurality of interrupt registers 140 each clocked by a bus clock (e.g., the clock A signal 60) and a counter 142 clocked by the clock B signal 70. In the depicted embodiment, the plurality of interrupt registers 140 includes four registers to capture characteristics of the one or more interrupting events, for example, during clock switching of the clock A signal 60. Namely, a trim register 144, a counter register 146, an alarm register 148, and a status register 150 may be provided to store timing information pertaining to the occurrence of the interrupting events. For example, such clock switching may be performed through the clock switch 95 in response to the clock switching signal 100 as shown in FIG. 1. Therefore, the interrupt recording module 125 records characteristics of one or more interrupting events within the status register 150.

Many computing devices, such as hand-held personal digital assistants (PDAs) or wireless devices including, mobile phones or mobile computers (a hand-held computer, palm top computer or notebook computer, as examples) may have at least one sleep mode to conserve power when the computing device is not currently being used. In this sleep mode, one or more clocks to a particular semiconductor package, or chip, of the computing device may be "OFF." For example, in a microprocessor of the computing device, one or more clocks may be switched "OFF" during the sleep mode while the clock to a particular region is kept "ON" to operate input/output (I/O) circuitry or real-time clock of the microprocessor.

As such, these events may be programmed to generate an interrupt. After, for example, a voltage/frequency change has been completed or after a successful wakeup from the sleep mode is completed, the clock A signal 60 may start running again. As an example, in a particular device, the I/O circuitry may be kept in a low power state during the sleep mode (instead of being shut down) to keep the external interface to the microprocessor enabled. For example, during the sleep mode, some output terminals of the I/O circuitry need to be held in specific high or low logic states while the core circuitry is shut off by clock switching; and some input terminals of the I/O circuitry need to be enabled to permit a wakeup of the microprocessor from the sleep mode.

In the case that an interrupt generating event, such as an alarm match event or a clock tick event, occurs in a particular synchronous system, it may not be possible for the interrupt recording module 125 to register this information into the status register 150 since the clock to this register (i.e., the clock A signal 60) may have been stopped during this period. For instance, during a sleep mode or during voltage/frequency change, the clock A signal 60 (e.g., the bus clock) may be stopped. However, the clock B signal 70 (e.g., a 32 kHz clock), which clocks the counter 142, and is also used to generate a lower frequency (e.g., one Hz) clock tick event as well, may be running in a particular synchronous system.

Consistent with one embodiment, the control logic 90 further comprises a state machine protocol logic 155 that may be implemented to temporarily remember the one or more interrupting events, (such as an alarm match event or a clock tick event) during the time that the clock A signal 60 is stopped. Subsequently, when the clock A signal 60 is restarted, the control logic 90 registers this information at a predetermined location (e.g., a particular bit or bits) in the status register 150. In one case, based on the state machine protocol logic 155, switching of the clock A signal 60 may be handled while transferring data in the fully synchronous system which may include at least two independently clocked logic domains (e.g., the clock A and B domain logic blocks 55 and 65 of FIG. 2).

Additionally, a clock frequency synchronizer 157 may be provided for the state machine protocol logic 155 to enable an asynchronous data transfer between at least two independently clocked logic domains, in one embodiment. Moreover, a protocol may cause the transition between the first state and the second state in the state machine protocol logic 155 for the purposes of driving the clock frequency synchronizer 157. Under the control of such protocol, state machine protocol logic 155 may be operated to remember the one or more occurrences of the interrupting event while the clock A signal 60 is in the switched "OFF" condition. In this way, depending upon a particular transition in the state machine protocol logic 155 form a particular first state (e.g., a reset state) to a particular second state (e.g., a plurality of non-reset states), the nature of occurrence of the interrupting event may be captured accordingly within one or more registers of the plurality of the registers 140.

Furthermore, in one embodiment, the control logic 90 comprises a rising edge detect logic 160 clocked with the clock A signal 60. The rising edge detect logic 160 is implemented to detect a transition to either one of the plurality of reset or non-reset states. In addition, a set of external and internal signals may cooperatively determine the flow of control between the control logic 90 and the interrupt indicator 85. While a mode signal 162 is asserted when the synchronous system is in a sleep mode, a parameter change signal 164 is asserted when the synchronous system is undergoing voltage/frequency change, and an alarm signal 166 indicates that there was a match between the counter register 146 and the alarm register 148 in the clock B signal 70 domain, i.e., the 32 kHz clock domain, as an example.

Figure 3:
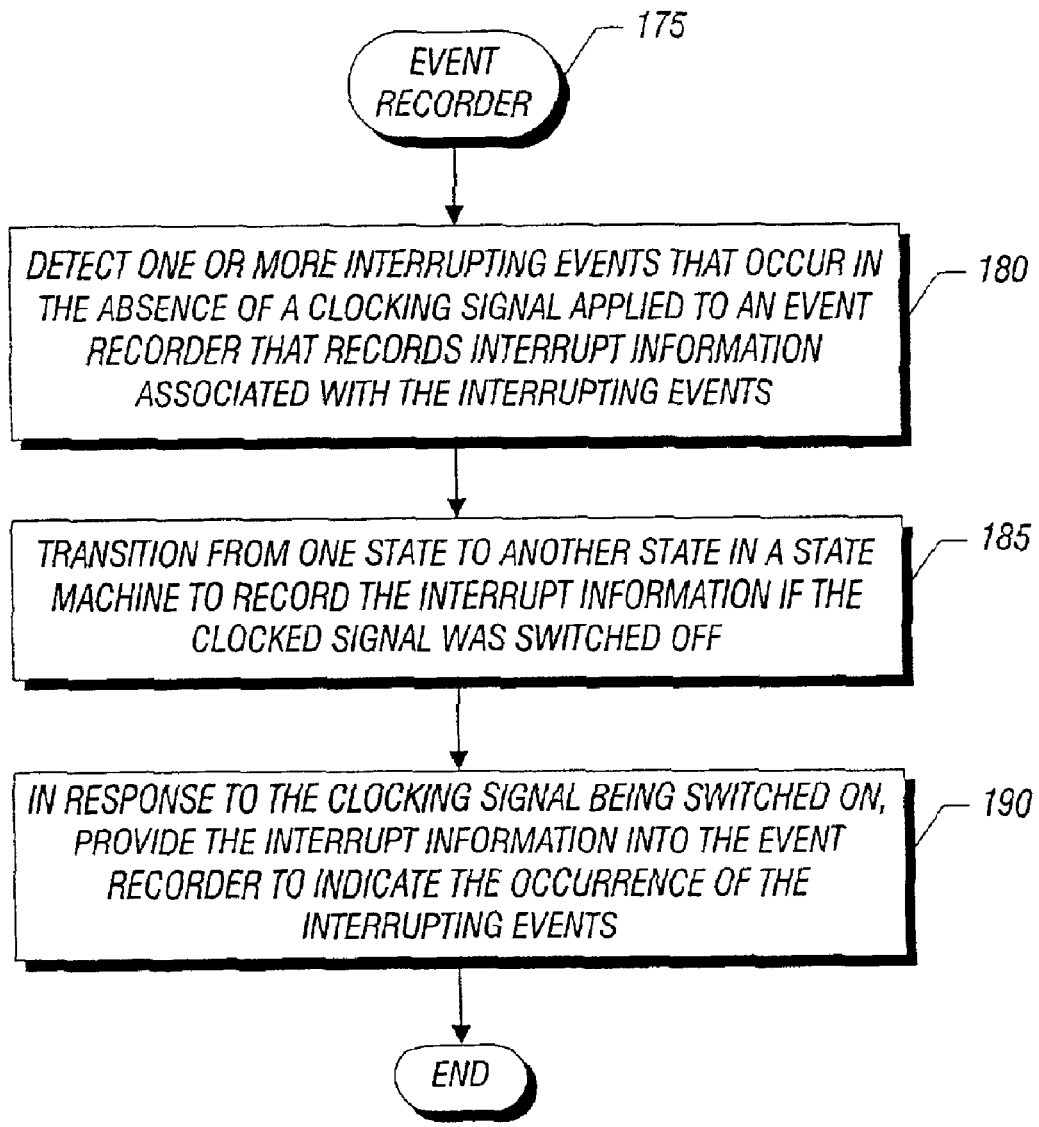
FIG. 3 is a flow chart of an event recorder that incorporates a low to high frequency synchronizer protocol to provide data transfer between the asynchronous clocked logic domains of FIG. 1 in accordance with one embodiment of the present invention.

An event recorder mechanism 175 for the control logic 90 to provide data transfer between the asynchronous clocked logic domains is shown in FIG. 3 consistent with one embodiment of the present invention. In operation, one or more interrupting events are detected that occur in the absence of a clocking signal applied to the event recorder 80 (FIG. 1) that records interrupt information associated with the interrupting events (block 180). Then, a state machine deployed to record the interrupt information transitions from a one state to another state if the clocked signal was switched "OFF" (block 185). Finally, as shown in block 190, in response to the clocking signal being switched "ON," the interrupt information may be provided into the event recorder 80 to indicate the occurrence of the interrupting events.

Figure 4:
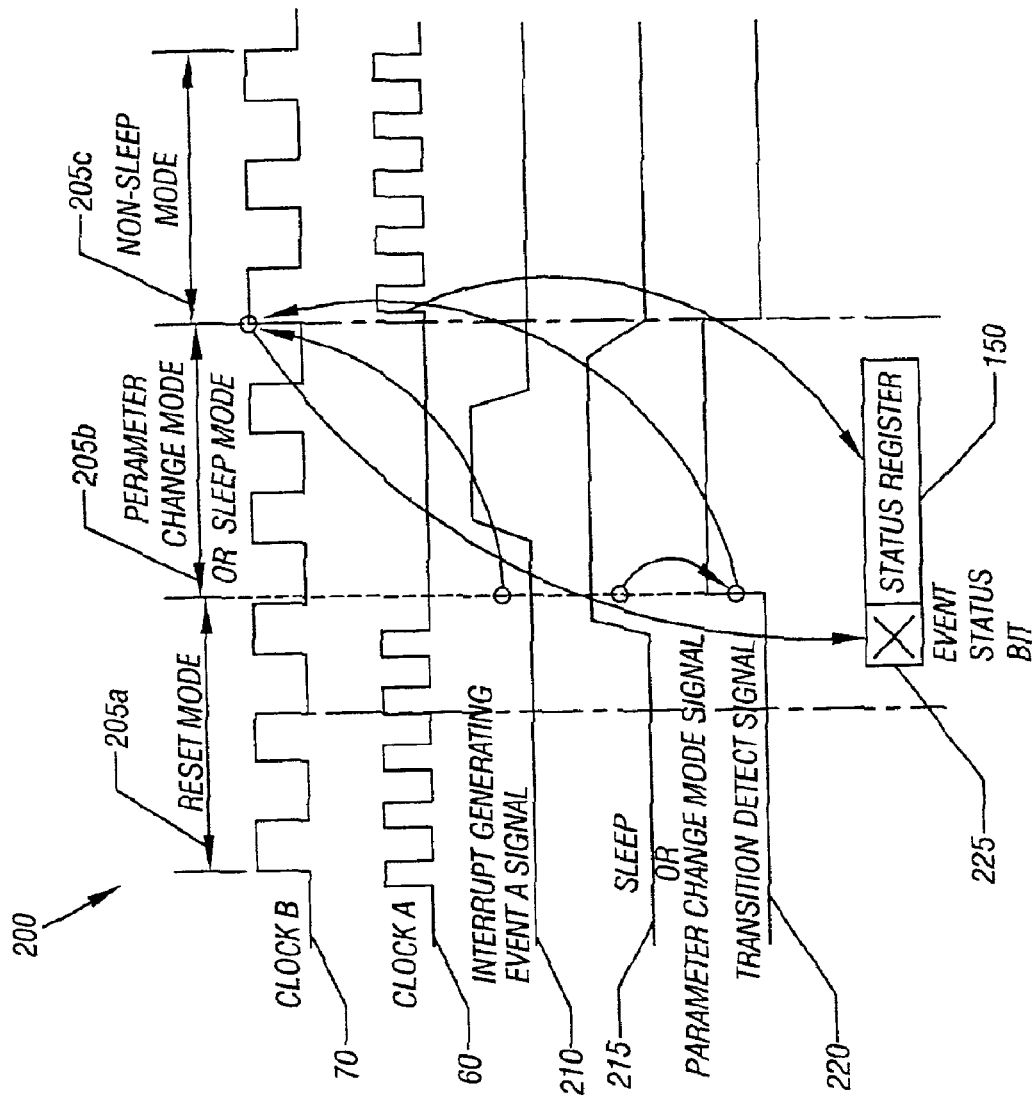
FIG. 4 is a timing chart for the event recorder of FIG. 3 in accordance with one embodiment of the present invention.

A timing chart 200 is shown in FIG. 4 for the event recorder 80 of FIG. 1 in accordance with one embodiment of the present invention. Also, a particular chain of the signal activations and transitions is illustrated according to one embodiment of the present invention. To handle the interrupt generating events, the clock A and B signals 60 and 70 are illustrated in the context of three modes of operation, i.e., a reset mode 205a, a parameter change or sleep mode 205b and a non-sleep mode 205c for the semiconductor device 50. As an example, a high pulse of an interrupt generating event "A" signal 210 indicates occurrence of the event "A." A high pulse of a sleep or parameter change mode signal 215 indicates a transition from the reset mode 205a to the parameter change or sleep mode 205b. A transition detect signal 220 indicates that a mode is changed.

Based on the timing chart 200, one operation for interrupt recording mechanism for situations where some logic is not supplied a clock involves temporarily storing the occurrence of the event "A" in response to the interrupt generating event "A" signal 210 prior to registering the event "A" within the status register 150. Within the status register 150, for such purposes, an event status bit 225, being generally indicative of the nature of the event "A," may be set or reset, for example, by toggling. Alternatively, one or more such bit or bits may be written at other registers or appropriate storage locations for the event recorder 80. In any case, the depicted signal activations and transitions (i.e., restarting of the clock A signal 60, assertion of the transition detect signal 220 in conjunction with arrival of the rising edge of the clock A signal 60) cause synchronous registration of the event "A."

In doing so, for the clock A signal 60, one or more conditions including, a switched "OFF" condition and a switched "ON" condition may be derived in response to the clock switching signal 100 (See FIG. 1) being applied to the clock switch 95 (See FIG. 1). According to one embodiment, the switched "OFF" condition may cause the interrupt indicator 85 (See FIG. 2) to indicate one or more occurrences of the interrupting event or one or more interrupting events in the status register 150 that includes the event status bit 225.

Figure 5:
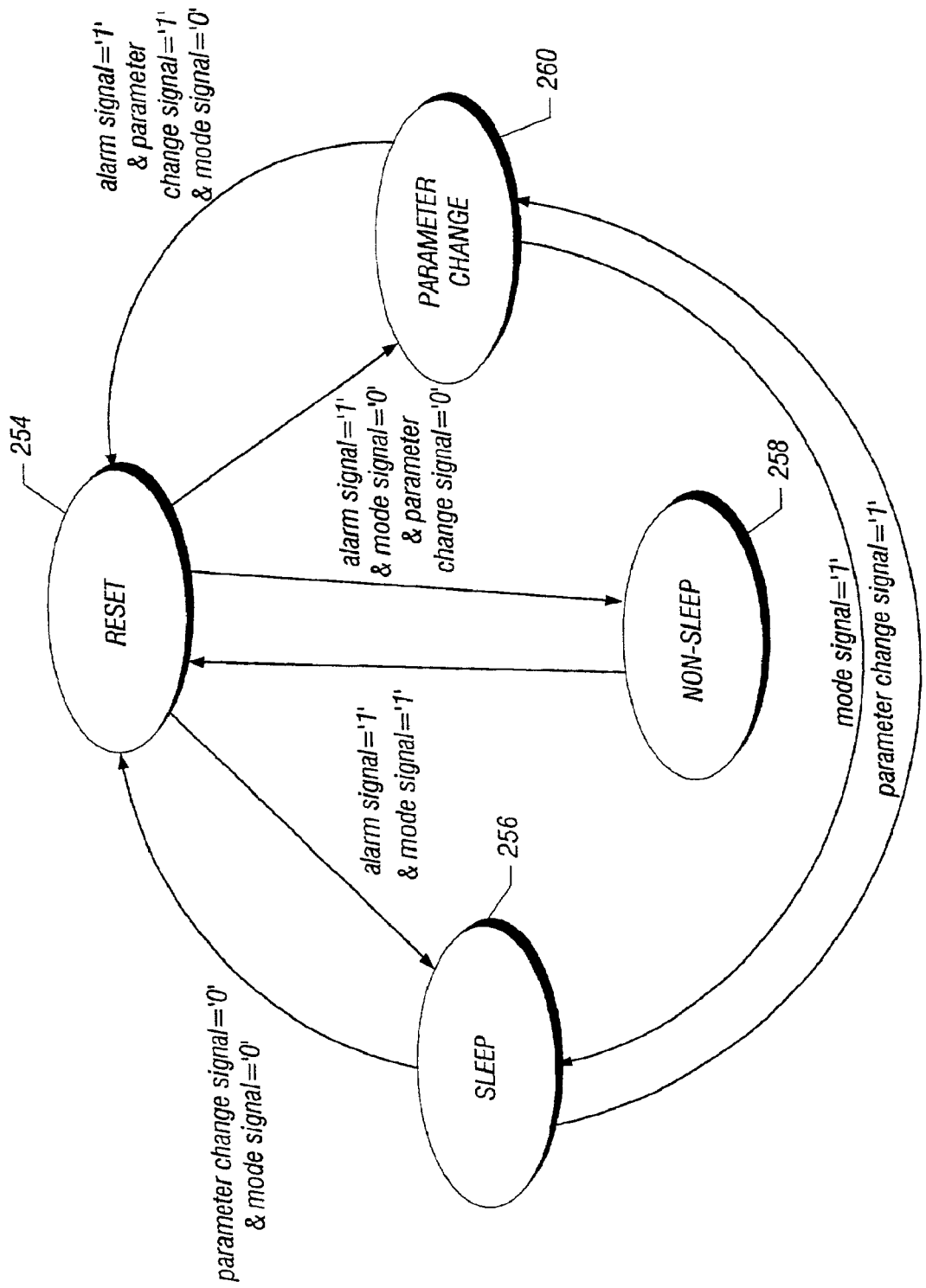
FIG. 5 is a state machine for implementing the low to high frequency synchronizer protocol of in accordance with one embodiment of the present invention.

For implementing the event recorder mechanism 175 of FIG. 3, a state machine 250 having one or more registers is shown in FIG. 5 according to one embodiment of the present invention. The state machine 250 may be implemented in the state machine protocol logic 155 of FIG. 1. The registers in the state machine 250 are clocked by the clock B signal 70 (e.g., 32 kHz clock). In accordance with one particular embodiment, the state machine 250 includes a RESET state 254, a SLEEP state 256, a NON-SLEEP state 258, and a PARAMETERCHANGE state 260. Here, the default state is the RESET state 254. The SLEEP state 256 indicates that an alarm match event occurred when the synchronous system was either in a sleep mode or a deep sleep mode which typically causes a device to stay in a substantially non-operational status. The NON-SLEEP state 258 indicates that an alarm match event occurred during normal mode of operation (i.e. when the clock A signal 60 was present). The PARAMETERCHANGE state 260 indicates that an alarm match event occurred during a voltage/frequency change.

According to one embodiment, one operation in the context of an alarm match event uses the state machine 250 as depicted in FIG. 5. The state machine 250 may also handle the clock tick event, or other such interrupting events as well. For the present exposition, as shown in FIG. 2, the set of external and internal signals including, the mode signal 162, the parameter change signal 164, and the alarm signal 166 indicate transitions between a high level "1" and a low level "0" for one particular embodiment. However, many variations to these specific transitions based on a desired application may be readily devised without departing from the scope of the present invention.

In operation, the rising edge detect logic 160 clocked with the clock A signal 60 detects transition to either one of the non-reset states, i.e., the SLEEP state 256, PARAMETER-CHANGE state 260 or the NON-SLEEP state 258. If the clock A signal 60 is turned "OFF" when the interrupting event occurs, then on the resumption of the clock A signal 60, the transition to the particular state is registered. For instance, when the clock A signal 60 starts running again transition to any one of the non-reset states results in the setting of a bit in the status register 150. According to one embodiment, if an alarm match event occurs during a sleep mode or voltage/frequency change, the state machine 250 parks itself in the appropriate state until another alarm match event occurs during the time the clock A signal 60 is "ON", in which case it transitions to a specific predetermined non-reset state, for example, the NON-SLEEP state 258.

Figure 6:
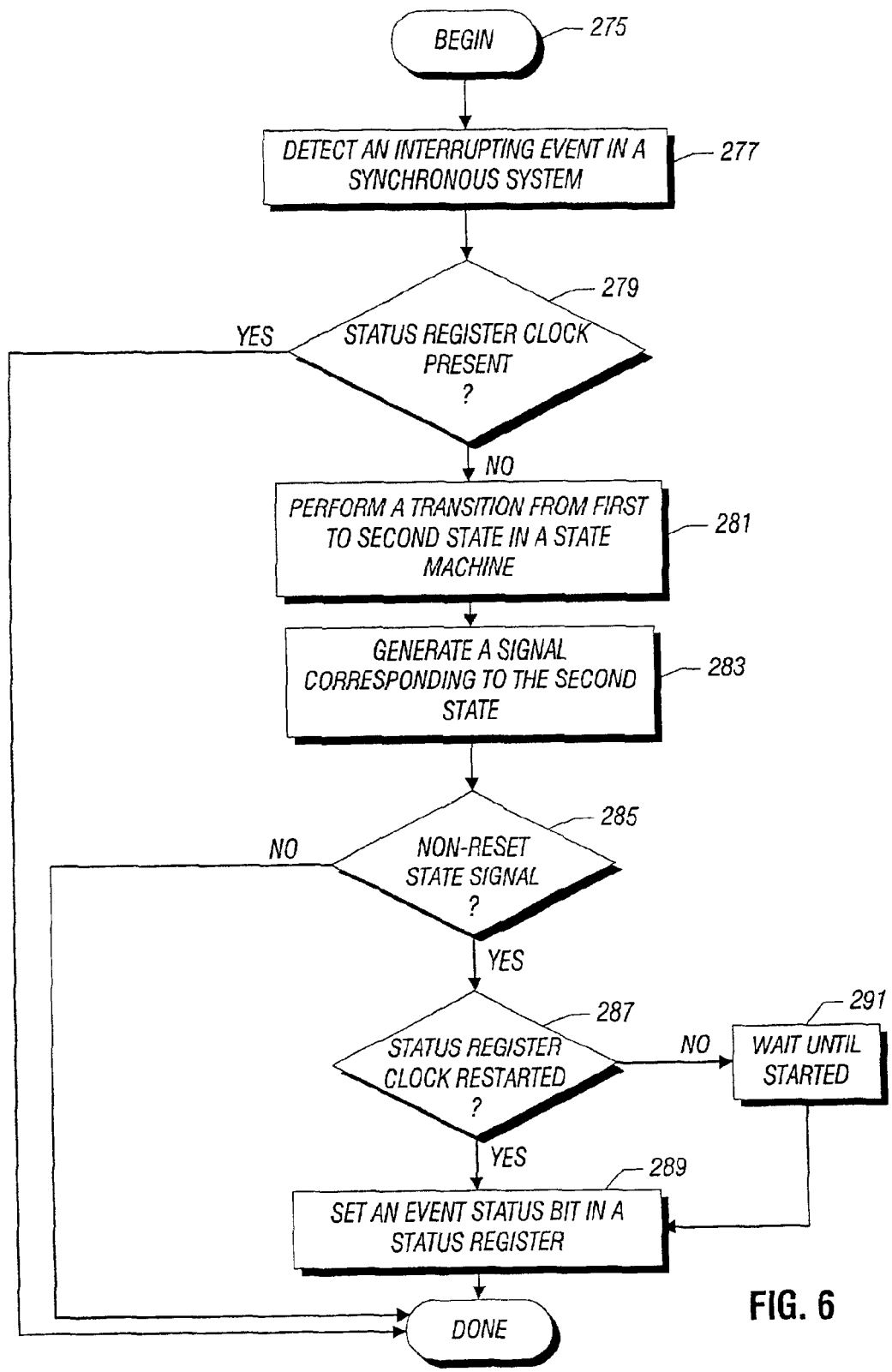
FIG. 6 is a flow chart of a synchronously recording interrupt mechanism employing the state machine of FIG. 5 to provide a fully synchronous system in accordance with one embodiment of the present invention.

A synchronously recording interrupt mechanism 275 shown in FIG. 6 employs the state machine 250 of FIG. 5 that may be incorporated in the state machine protocol logic 155 of FIG. 1 to provide a fully synchronous system in accordance with one embodiment of the present invention. One or more occurrences of an interrupting event, or alternatively one or more interrupting events, may be detected in block 277 for a synchronous system.

A check at the diamond 279 indicates whether the clock A signal 60 to the status register 150 is present. If so, the status register 150 may record information associated with at least one occurrence of the interrupting event. That is, the synchronously recording interrupt mechanism 275 may terminate as the occurrence of the interrupting event may be recorded without a need for the temporary registration. Otherwise, the state machine 250 proceeds to transition from a particular first state to a particular second state. However, the information associated with the occurrence of the interrupting event may later be registered into the status register 150 based on the transition.

In one embodiment, the synchronously recording interrupt mechanism 275 automatically responds to switching of the clock A signal 60 from first to second condition by selectively transitioning from one to another state in the state machine 250. For example, a signal corresponding to the transition to the particular second state may be generated at the block 283. Then, a check at the diamond 285 indicates whether a non-reset state signal is provided. If that is the case, another determination as to starting of the clocking signal, i.e., the clock A signal 60 to the status register 150 may further be made. Otherwise, the synchronously recording interrupt mechanism 275 may end the current cycle.

Next, a check at the diamond 287 indicates whether the clocking signal to the status register 150 is restarted. If so, in response to the clock A signal 60 (i.e., being restarted from the switched "OFF" condition to the switched "ON" condition) one or more occurrences of the interrupting event or one or more interrupting events may be appropriately registered, for example, simply by toggling the event status bit 225 of the status register 150 according to one embodiment (block 289). Conversely, the synchronously recording interrupt mechanism 275 waits until the clock A signal 60 is restarted at block 291.

In another embodiment, a synchronous interrupting event recording mechanism is implemented within a computing system including multiple asynchronous clock domains. Such synchronous interrupting event recording mechanism may be advantageous in that it comprises a relatively simple circuit structure in some embodiments. In addition, the synchronous interrupting event recording mechanism may accordingly provide simplicity in design and verification and reliability of the system than an asynchronous interrupting event recording mechanism in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether a clocking signal used for latching an event at a designated location is absent;
   if so, providing information to another location regarding the event if the event occurred in the absence of the clocking signal, otherwise latching the event at the designated location; and
   recording said information associated with at least one occurrence of said event in a state machine.

2. The method of claim 1, further comprising:
   applying said clocking signal to an event recorder; and
   registering the information associated with the at least one occurrence of said event into the event recorder based on a transition from a first state to a second state in the state machine.

3. The method of claim 2, further comprising:
   providing an interrupting event for said event;
   providing said designated location in a first clocked logic domain; and
   providing said another location in a second clocked logic domain.

4. The method of claim 1, further comprising automatically responding to switching of the clocking signal from a first to a second condition by transitioning from said first to second state in said state machine.

5. The method of claim 4, including providing for the clocking signal, a switched "OFF" condition for the first condition and a switched "ON" condition for the second condition.

6. The method of claim 2, further comprising causing said event recorder to indicate said at least one occurrence of said event in at least one register including an event status bit.

7. The method of claim 2, further comprising handling switching of the clocking signal based on the state machine while transferring data across at least two independently clocked logic domains.

8. The method of claim 7, further comprising providing a synchronizer for said event recorder to enable an asynchronous data transfer between the at least two independently clocked logic domains.

9. The method of claim 8, further comprising:
implementing a protocol to cause the transition between said first state and said second state in said state machine; and
driving said synchronizer in response to the transition.

10. The method of claim 2, further comprising operating said state machine to:
store the information associated with the at least one occurrence of said event while the clocking signal is in a switched "OFF" condition based on the transition in said state machine from said first state including an initial state to said second state including a plurality of target states; and
register the information associated with the at least one occurrence of said event by toggling an event status bit of at least one register in response to the clocking signal being restarted from said switched "OFF" condition to a switched "ON" condition.

11. An apparatus, comprising:
an interface operably coupled between a designated location and another location;
a control logic coupled to said interface to determine whether a clocking signal to latch an event at the designated location is absent, and to provide information regarding the event if the event occurred in the absence of the clocking signal to the another location, and to record said information associated with at least one occurrence of said event in a state machine.

12. The apparatus of claim 11, wherein said control logic to:
apply said clocking signal to an event recorder; and
register the information associated with the at least one occurrence of said event into the event recorder based on a transition from a first state to a second state in the state machine.

13. The apparatus of claim 12, wherein said event includes an interrupting event, said designated location includes a first clocked logic domain and said another location includes a second clocked logic domain.

14. The apparatus of claim 12, wherein said control logic to automatically respond to switching of the clocking signal from a first to a second condition by transitioning from said first to second state in said state machine.

15. The apparatus of claim 14, wherein the first condition includes a switched "OFF" condition and the second condition includes a switched "ON" condition.

16. The apparatus of claim 12, wherein the event recorder to indicate said at least one occurrence of said event in at least one register including an event status bit.

17. The apparatus of claim 12, wherein said control logic to switch the clocking signal based on the state machine while transferring data across at least two independently clocked logic domains.

18. The apparatus of claim 17, wherein said control logic further comprises a synchronizer to operate said event recorder to enable an asynchronous data transfer between the at least two independently clocked logic domains.

19. The apparatus of claim 18, wherein said control logic further to implement a protocol to cause the transition between said first state and said second state in said state machine and to drive said synchronizer in response to the transition.

20. The apparatus of claim 19, wherein said protocol to operate said state machine to:
store the information associated with the at least one occurrence of said event while the clocking signal is in a switched "OFF" condition based on the transition in said state machine from said first state including an initial state to said second state including a plurality of target states; and
register the information associated with the at least one occurrence of said event by toggling an event status bit of at least one register in response to the clocking signal being restarted from the switched "OFF" condition to a switched "ON" condition.

21. An article comprising a medium including instructions that if executed enable a processor-based system to:
determine whether a clocking signal used for latching an event at a designated location is absent;
if so, provide information to another location regarding the event that occurred in the absence of the clocking signal; and
record said information associated with at least one occurrence of said event in a state machine.

22. The article of claim 21, further comprising instructions that if executed enable the processor-based system to:
apply said clocking signal to an event recorder; and
register the information associated with the at least one occurrence of said event into the event recorder based on a transition from a first state to a second state in the state machine.

23. The article of claim 22, further comprising instructions that if executed enable the processor-based system to:
provide an interrupting event for said event;
provide said designated location in a first clocked logic domain; and
provide said another location in a second clocked logic domain.

24. The article of claim 22, further comprising instructions that if executed enable the processor-based system to automatically respond to switching of the clocking signal from a first to a second condition by transitioning from said first to second state in said state machine.

25. The article of claim 24, further comprising instructions that if executed enable the processor-based system to provide for the clocking signal, a switched "OFF" condition for the first condition and a switched "ON" condition for the second condition.

26. The article of claim 22, further comprising instructions that if executed enable the processor-based system to cause said event recorder to indicate said at least one occurrence of said event in at least one register including an event status bit.

27. The article of claim 22, further comprising instructions that if executed enable the processor-based system to switch the clocking signal based on the state machine while transferring data across at least two independently clocked logic domains.

28. The article of claim 27, further comprising instructions that if executed enable the processor-based system to synchronize said event recorder to enable asynchronous data transfer between the at least two independently clocked logic domains.

29. The article of claim 28, further comprising instructions that if executed enable the processor-based system to:

implement a protocol to cause the transition between said first state and said second state in said state machine; and drive said synchronization in response to the transition.

30. The article of claim 29, further comprising instructions that if executed enable the processor-based system to operate said state machine based on the protocol to:

store the information associated with the at least one occurrence of said event while the clocking signal is in a switched "OFF" condition based on the transition in said state machine from said first state including an initial state to said second state including a plurality of target states; and register the information associated with the at least one occurrence of said event by toggling an event status bit of at least one register in response to the clocking signal being restarted from the switched "OFF" condition to a switched "ON" condition.

\* \* \* \* \*